Sept. 19, 1961  W. R. KIRCHNER  3,000,317
TAPERED TUBULAR PROPELLANT GRAIN
Filed Sept. 29, 1955

INVENTOR.
WERNER R. KIRCHNER
BY
ATTORNEYS

United States Patent Office 3,000,317
Patented Sept. 19, 1961

---

3,000,317
TAPERED TUBULAR PROPELLANT GRAIN
Werner R. Kirchner, Arcadia, Calif., assignor, by mesne assignments, to the United States of America as represented by the Secretary of the Navy
Filed Sept. 29, 1955, Ser. No. 537,610
1 Claim. (Cl. 102—98)

This invention relates to propellants and more particularly to an internal burning propellant grain capable of producing a substantially constant pressure in a combustion chamber of increasing volume.

Solid propellant grains have been used in many instances as an energy source and, particularly, in catapult launchers to accelerate aircraft and missiles in an initial booster phase. Launchers of this type generally comprise a breech type combustion chamber to receive the solid propellant charge, a tube and a piston which is accelerated by the pressure created by the expanding propellant gases generated during propellant combustion.

To enable the launcher to reach the desired terminal velocity at low acceleration levels, and at the same time maintain a relatively low launcher length, it is desirable to maintain the acceleration constant and at a level close to the maximum allowable value. This result can be achieved by designing the solid propellant charge to release the generated gases at a programmed rate to meet the ballistic requirements of the launcher. It has been found that conventional solid grain configurations do not meet this requirement for launcher operation because they produce excessive accelerations at the initial stages of the run.

The performance of a catapult system is greatly dependent on the initial transient conditions occurring immediately after ignition. During repeated launchings considerable amounts of water are used to cool the catapult. Accumulation of water in the launcher breech will affect the burning rate of the external burning type of propellant charge resulting in a change in the ignition characteristics and, consequently, the performance of the launcher.

According to the present invention, the ballistic requirements of a catapult launcher could be met by employing an internal burning propellant grain having a tapered tubular body construction. The particular composition of the propellant material does not form a part of this invention. In the preferred embodiment the tubular body is provided with a longitudinal bore having a central web portion and lateral portions tapering outwardly to both body ends. All inner and outer surfaces of the grain, with the exception of the inside diameter surface are coated with a conventional restricting material inhibiting the grain surfaces from burning.

A principal object of this invention is to provide an internal burning solid propellant grain capable of producing a substantially uniform pressure in a combustion chamber of increasing volume.

Another object is to provide such a propellant grain suitable for use in a catapult launcher, and having a tapered configuration which can be varied to meet particular launched requirements, and a grain in which the surfaces are coated with an inhibiting material to control the burning rate.

A further object is to provide a propellant grain which is simple to cast and process.

Other objects are to provide a propellant charge capable of being supported in the combustion chamber in a simple and expedient manner; and which will not be affected by the presence of cooling liquid in the combustion chamber of the launcher.

Other objects and many of the attendant advantages of this invention will be readily appreciated as the same becomes better understood by reference to the following detailed description when considered in connection with the accompanying drawings wherein.

Figure 1:
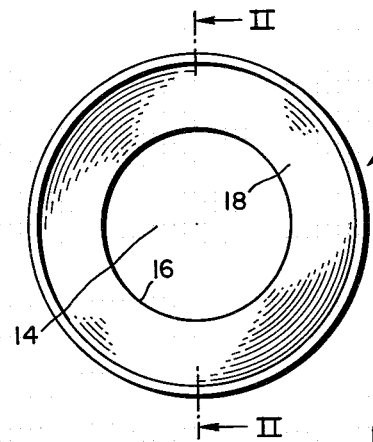
FIG. 1 is an end view of a propellant grain of this invention.

Referring now to the drawing, wherein like reference characters designate like or corresponding parts throughout the several views, there is shown generally in FIG. 1 a propellant grain 10 comprising a tubular body 12 having a longitudinal bore 14 extending from one end of the grain to the other. The outer peripheral surface of body 12 conforms generally to the configuration of the combustion chamber which is usually cylindrical. The inner peripheral surface of the bore has a central constant diameter portion 16 which constitutes the initial burning surface, and tapered lateral portions 18 on each side diverging to the opposite grain ends. As will be noted in the examples later described the length of bore portion 16 is a minor portion of the total length of the grain. The grain may be constructed as illustrated to be symmetrical about a longitudinal plane and a transverse plane, which will simplify manufacture and facilitate loading of the charge in the launcher.

The grain may be composed of any suitable conventional solid propellants; however, the ballistic characteristics of the propellant must be taken into consideration as will be later described.

Using the foregoing tapered grain construction, ignition occurs internally in the bore 16 and burns outwardly to the grain periphery. It is desirable that the amount of the propellant burned increases with time to provide substantially constant pressure if burned in a chamber of increasing volume. A constant pressure ensures a constant acceleration which is an ideal performance characteristic of piston-type launchers.

To obtain such a programmed rate of grain burning, an inhibitor or restriction 20 is applied to the outer grain periphery and the tapered ends leaving the internal surface of bore portion 16 uncoated. One restriction material found to be satisfactory is a plastic-clay composition consisting of an inert material like Dixie clay or diatomaceous earth, suspended in a matrix of polyester fuel system, and may be applied to the grain by casting or other conventional processes. The thickness of restriction 20 will vary depending on the degree of inhibiting desired. A thickness of 0.10 inch has been found to be satisfactory.

The ballistic characteristics of the propellant, the geometry of the launcher, and the launching requirements will dictate the number of the grains to be used as the launcher charge and the configuration of the tapered grain. By adjusting the angle of the grain taper, web thickness, and number of grains to be used as the charge in a particular launcher, launcher loads can be accelerated over a wide range of catapults to different launching velocities.

Figure 2:
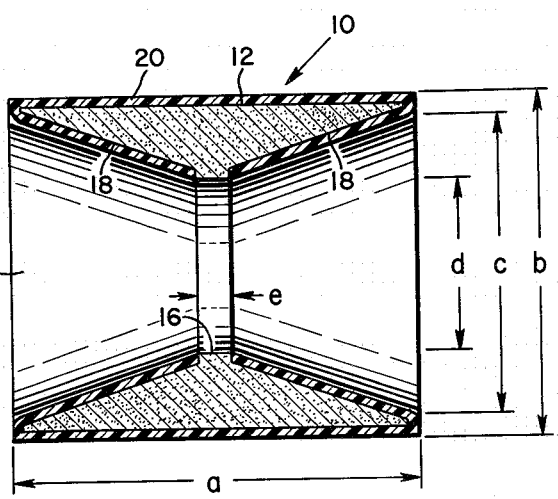
FIG. 2 is a longitudinal section taken along line II—II of FIG. 1.
Figure 3:
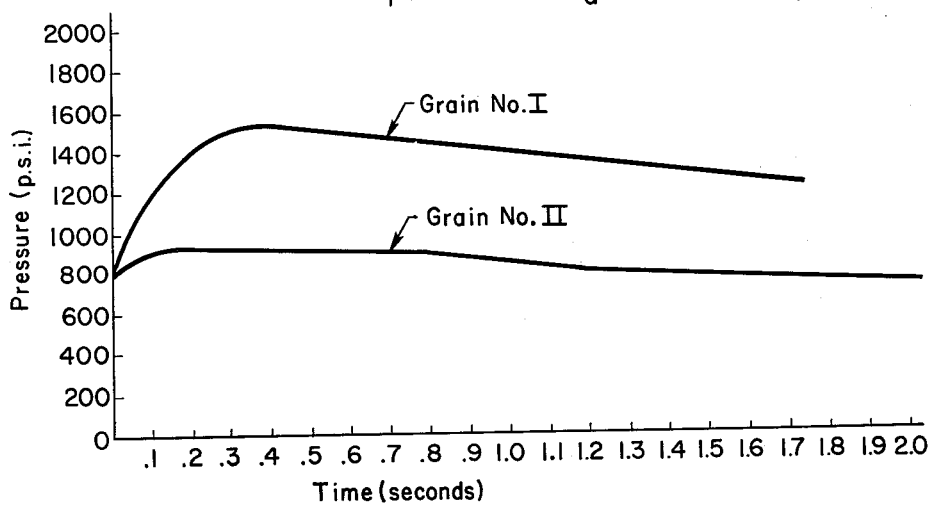
FIG. 3 is a plot of a typical pressure vs. time curves of a launcher using specified charges of propellant grains of this invention.

Referring to FIG. 2, the dimensions of a propellant grain No. I that has been designed for a launcher having a 8.5 inch diameter combustion chamber are as follows: $a=9.5$ inches, $b=8$ inches, $c=7.5$ inches, $d=4.46$ inches, and $e=0.8$ inch. Employing a charge of 10 grains having the aforementioned dimensions, an 18,000 pound launcher load can be accelerated to a velocity of 134 knots at the end of a 185 foot power stroke. The performance calculations of the results are shown by the curve designated as grain No. I in FIG. 3, where pressure (p.s.i.) is plotted as the ordinate and time (seconds) is plotted as abscissa. It will be noted that launcher pressure remains substantially constant throughout launching, producing a constant acceleration which is an operational requirement for launcher operations.

Using a 34,000 pound launcher load, it has been determined that a launching velocity of 71.6 knots at the end of a 175-foot power stroke can be obtained by employing a charge of two No. II grains having the following dimensions (referring to FIG. 2): $a=17.5$ inches, $b=8.0$ inches, $c=7.2$ inches, $d=4.46$ inches, and $e=1.5$ inches. The performance calculations of the results is shown by the curve designated as grain No. II in FIG. 3, indicating that a substantially constant launcher pressure and acceleration is obtained.

The tapered, tubular grain configuration of this invention produces a burning rate that will satisfy the pressure and acceleration requirements of launchers, particularly of the piston type. The dimensions of the grain configuration may be varied to satisfy the particular launching demands. The simplicity of casting and processing in manufacturing the grain is a definite advantage over previously designed grain configurations.

Obviously many modifications and variations of the present invention are possible in the light of the above teachings. It is therefore to be understood that within the scope of the appended claims the invention may be practiced otherwise than as specifically described.

I claim:

A solid propellant grain for use in piston-type catapult launchers comprising a tubular body of combustible material, said body having a bore open at both ends and formed with a central portion of uniform diameter and end portions tapering from the central portion outwardly towards the ends, said central portion being a minor portion of the body length, a layer of combustible inhibiting material applied to all surfaces of the body except the surface of the central bore portion for restricting the burning characteristics of the grain from said central portion outwardly whereby a substantially constant pressure is produced when the grain is ignited in a chamber having an increasing volume.

References Cited in the file of this patent

UNITED STATES PATENTS

| | | |
|---|---|---|
| 1,074,809 | Newton | Oct. 7, 1913 |
| 2,504,648 | Chandler | Apr. 18, 1950 |
| 2,620,732 | Hickman | Dec. 9, 1952 |

FOREIGN PATENTS

| | | |
|---|---|---|
| 2,554 | Great Britain | 1877 |
| 160,940 | France | Mar. 14, 1884 |